(12) United States Patent
Leveridge et al.

(10) Patent No.: US 7,233,997 B1
(45) Date of Patent: Jun. 19, 2007

(54) DATA COMMUNICATIONS

(75) Inventors: Philip C. Leveridge, Suffolk (GB);
Michael I. Strange, Suffolk (GB);
David W. Parkinson, Suffolk (GB);
David Roberts, Suffolk (GB); Michael J. Kenning, Suffolk (GB); Robert I. Tibbitt-Eggleton, Ipswich (GB)

(73) Assignee: British Telecommunications plc, London (GB)

( * ) Notice: Subject to any disclaimer, the term of this patent is extended or adjusted under 35 U.S.C. 154(b) by 0 days.

(21) Appl. No.: 09/446,583

(22) PCT Filed: Jun. 26, 1998

(86) PCT No.: PCT/GB98/01876

§ 371 (c)(1),
(2), (4) Date: Dec. 22, 1999

(87) PCT Pub. No.: WO99/00960

PCT Pub. Date: Jan. 7, 1999

(30) Foreign Application Priority Data

Jun. 26, 1997 (GB) .................... PCT/GB97/01755

(51) Int. Cl.
*G06F 15/16* (2006.01)
*G06F 15/173* (2006.01)

(52) U.S. Cl. ............... 709/229; 709/217; 709/219; 709/225

(58) Field of Classification Search .......... 709/219, 709/225, 229, 217
See application file for complete search history.

(56) References Cited

U.S. PATENT DOCUMENTS

| | | | |
|---|---|---|---|
| 5,455,953 A * | 10/1995 | Russell | 710/266 |
| 5,506,961 A * | 4/1996 | Carlson et al. | 709/229 |
| 5,542,046 A * | 7/1996 | Carlson et al. | 726/5 |
| 5,560,008 A * | 9/1996 | Johnson et al. | 713/201 |
| 5,655,077 A * | 8/1997 | Jones et al. | 726/8 |
| 5,671,354 A * | 9/1997 | Ito et al. | 726/3 |
| 5,684,950 A * | 11/1997 | Dare et al. | 726/10 |
| 5,684,951 A * | 11/1997 | Goldman et al. | 726/6 |
| 5,706,427 A * | 1/1998 | Tabuki | 726/5 |
| 5,708,780 A * | 1/1998 | Levergood et al. | 709/218 |
| 5,812,776 A * | 9/1998 | Gifford | 709/203 |
| 5,907,621 A * | 5/1999 | Bachman et al. | 713/155 |

(Continued)

Primary Examiner—Rupal Dharia
Assistant Examiner—Kristie Shingles
(74) Attorney, Agent, or Firm—Nixon & Vanderhye P.C.

(57) ABSTRACT

An authentication server (AS) is provided which stores authentication details of authorised users, and a list of currently-authenticated users. A number of application servers (APS) are connected to the authentication server (AS), to allow the application servers (APS) to check the current authentication status of a user (T1, T2, T3) which requests service by the application servers (APS). There is also provided a method of authenticating a user for access via a terminal (T1, T2, T3) connected by an Internet Protocol connection to a Web server (APS), said method comprising: storing authentication details of authorised users; performing authentication of a user with reference to said stored authentication details; transmitting an identifier for the user's terminal (T1, T2, T3) to said terminal (T1, T2, T3) for storage thereon, the identifier being transmitted in such a manner that the identifier is transmitted by said user terminal (T1, T2, T3) with document requests directed at said Web server (APS); storing status data indicating said identifier to be an identifier of a terminal (T1, T2, T3) of a currently authenticated user; and allowing said Web server (APS) to access said status data in order to check the authentication status of a user on receipt of a document request containing said identifier.

25 Claims, 11 Drawing Sheets

U.S. PATENT DOCUMENTS

| | | | |
|---|---|---|---|
| 5,963,915 A * | 10/1999 | Kirsch | 705/26 |
| 6,061,741 A * | 5/2000 | Murphy et al. | 709/248 |
| 6,065,117 A * | 5/2000 | White | 713/159 |
| 6,070,243 A * | 5/2000 | See et al. | 709/229 |
| 6,088,805 A * | 7/2000 | Davis et al. | 726/10 |
| 6,275,867 B1 * | 8/2001 | Bendert et al. | 719/316 |
| 6,377,994 B1 * | 4/2002 | Ault et al. | 707/104.1 |
| 6,587,867 B1 * | 7/2003 | Miller et al. | 709/200 |
| 2002/0133412 A1 * | 9/2002 | Oliver et al. | 705/26 |

* cited by examiner

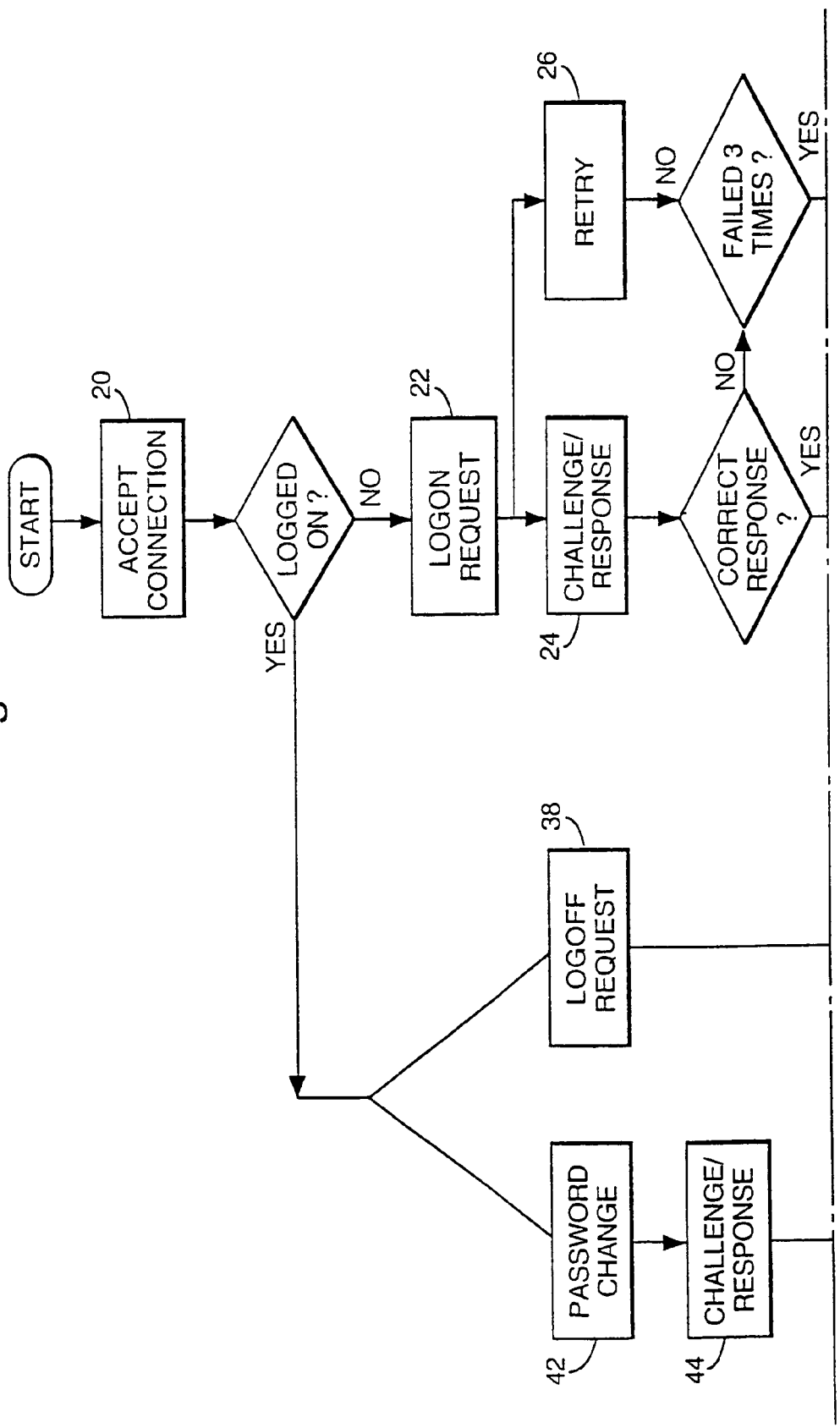

DATA COMMUNICATIONS

BACKGROUND OF THE INVENTION

1. Field of the Invention

This invention relates to data communications, and in particular, but not exclusively, to the communication of data via a public data communications network such as the Internet.

2. Description of Related Art

Due to the inherently insecure nature of data communications via the Internet, and due to the sensitive nature of some information which is transmitted, various proposals have been made for the encryption of data for transmission. Thus, although third parties may be able to intercept messages, third parties will only be able to read the data within the message if they are able to decrypt the message using an appropriate encryption key.

In public-key cryptography, such as that used in the RSA cryptography system, each person who is to receive encrypted data has a public key which is made available to anyone wishing to send that person data, and a private key which remains confidential. Data encrypted with the public key can only be decrypted with their private key. This system suffers drawbacks in that, in order to send another party an encrypted message, the sending party must know the public key of the receiving party. Also, the authenticity of the sending party cannot readily be identified since the public key is, by definition, available to any other party.

Another type of encryption system is secret-key cryptography, also referred to as symmetric cryptography. In secret-key cryptography, the sending party and the receiving party share a common secret encryption key, which is used both to encrypt data before transmission, and to decrypt the data after reception. One drawback of this system is that the two parties must, before transmission of the encrypted data, have agreed upon the shared secret key to be used.

A further problem encountered in communications over the Internet is that of the authentication of a user. For example, when a conventional Web server contains premium content documents, the Web server checks a username and password, which must be previously established, transmitted with a document request, each time a premium content document is requested. Many Web pages contain a number of documents (e.g. text files, image files, sound files), for each of which the username and password check is necessary. This password-based authentication procedure is resource intensive, particularly when the user wishes to have access to a large number of documents.

WO 96 42041 A describes an authentication server which performs authentication of a client terminal and then issues a Re-direct command to re-direct the client terminal to a desired content server. The Re-direct command provides a Uniform Resource Locator (URL) which, in addition to the normal URL of the content server, also includes what is referred to as a "session identification" (SID), which the content server may validate entirely independently of the authentication server when it receives a Get command, which includes the modified URL, from the client terminal. Therefore, the authentication server in effect issues a "ticket" which is valid for a predetermined amount of time, and which includes self-validating means in the form of a digital signature, whereby, once the client terminal has a ticket, accesses guaranteed to the content server (providing the expiry period of the ticket has not lapsed).

BRIEF SUMMARY OF THE INVENTION

In accordance with one aspect of the invention there is provided a method of operating an authenticating server system for authenticating users at client terminals connected via a data communications network, to control access to a document stored on a resource server, said method comprising performing the following steps in said server system:

storing authentication details of authorized users:

receiving authentication data for a user from a client terminal of the user, and validating said authentication data by reference to said stored authentication details;

issuing an identifier for the user's terminal to said terminal for storage thereon, the identifier being transmitted in such a manner that the identifier is retransmitted by said user terminal with document requests directed at said resource server;

storing status data indicating said identifier to be a validated identifier of a terminal of a currently authenticated user, in response to said authentication step; and enabling said resource server to validate a request for said document from the user's terminal, which request includes said identifier, by checking said status data on receipt of said document request.

This aspect allows the transmitted identifier to be used to confirm the authenticated status of the user following an initial password-based authentication check.

The identifier may be transmitted as an HTTP cookie, such that a client browser automatically returns the identifier with any document request directed to a Web server to which the cookie is configured to be returned.

In accordance with a further aspect of the invention there is provided a method of operating an authenticating server system for authenticating users at client terminals remotely connected via a data communications network, to control access to a plurality of resource servers, said method comprising performing the following steps in said server system:

storing authentication details of authorised users;

performing remote authentication of a user by reference to said stored authentication details and during said remote authentication step generating status data, distinguishing said user from other users which are not currently authenticated, and a secret encryption key shared with said user;

storing said status data in storage means accessible to said plurality of resource servers to check an authentication status of said user by using an identifier for the user's terminal received in a service request; and storing said shared secret key in a data store accessible by at least one of said resource servers for use during communications with said user.

This aspect of the invention provides for the authentication of a user using a single authentication facility, which maintains the authentication status of users in the system. When a user wishes to access any of the application servers they may each use the facility to confirm the authentication status of that user, without needing to perform separate authentication procedures directly with the user. A shared secret key for use in communications between the resource server and the user is also generated in the authentication process.

BRIEF SUMMARY OF THE DRAWINGS

Further features and advantages of the present invention in its various aspects will be appreciated from the following description, referring to the accompanying drawings wherein.

DETAILED DESCRIPTION OF EXEMPLARY EMBODIMENTS OF THE INVENTION

Figure 1:
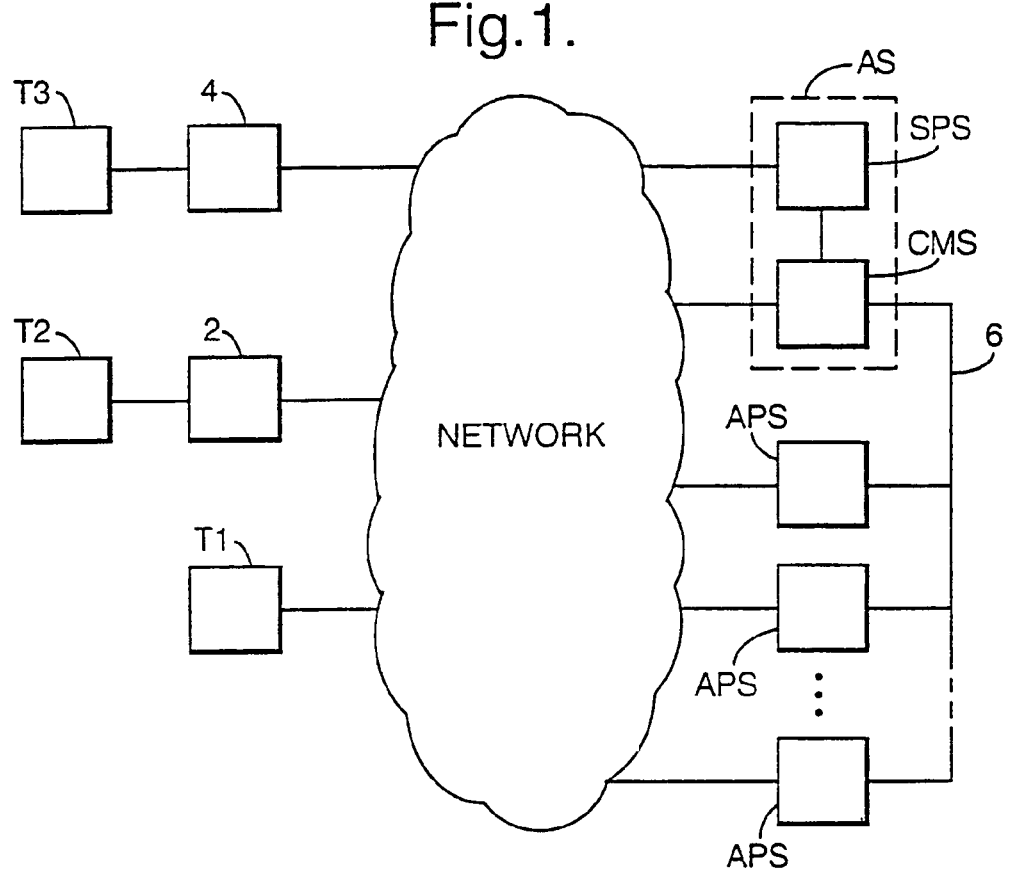
FIG. 1 is a block diagram schematically illustrating a data transmission arrangement in accordance with the present invention.

FIG. 1 is a block diagram illustrating a data processing system in accordance with an embodiment of the present invention. The system consists of an authentication server (AS), consisting of a secure password server (SPS) and a cache management server (CMS), and a plurality of application servers (APSs). Three different classes of user terminals T1, T2, T3 are connected to the system via a data communications network, in this embodiment the Internet.

The first is a terminal T1 having a unique IP address, and which can both open a TCP/IP connection and accept TCP/IP connection opening requests over the Internet. The second is a terminal T2 which has a unique IP address, which can open TCP/IP connections, but which cannot accept TCP/IP connection opening requests over the Internet, for example due to the presence of a fire wall 2 which the terminal T2 lies behind. The third is a terminal T3 which has no unique IP address, for example due to the use of a proxy server 4 through which the terminal T3 accesses the Internet. Communications over the Internet contain the IP address of the proxy server 4, rather than that of the terminal T3.

The application servers APS which are serviced by the authentication server are remotely connected to the CMS via secure communications links 6 (which may be separate physical links, or logical links which use secure encryption during communications), or are co-located with the authentication server.

Each of the servers illustrated in FIG. 1 may be implemented on a computing resource, such as a work station computer. Each of the access terminals may be implemented in the form of a work station computer, a net computer, a mobile communications terminal, etc.

Figure 2:
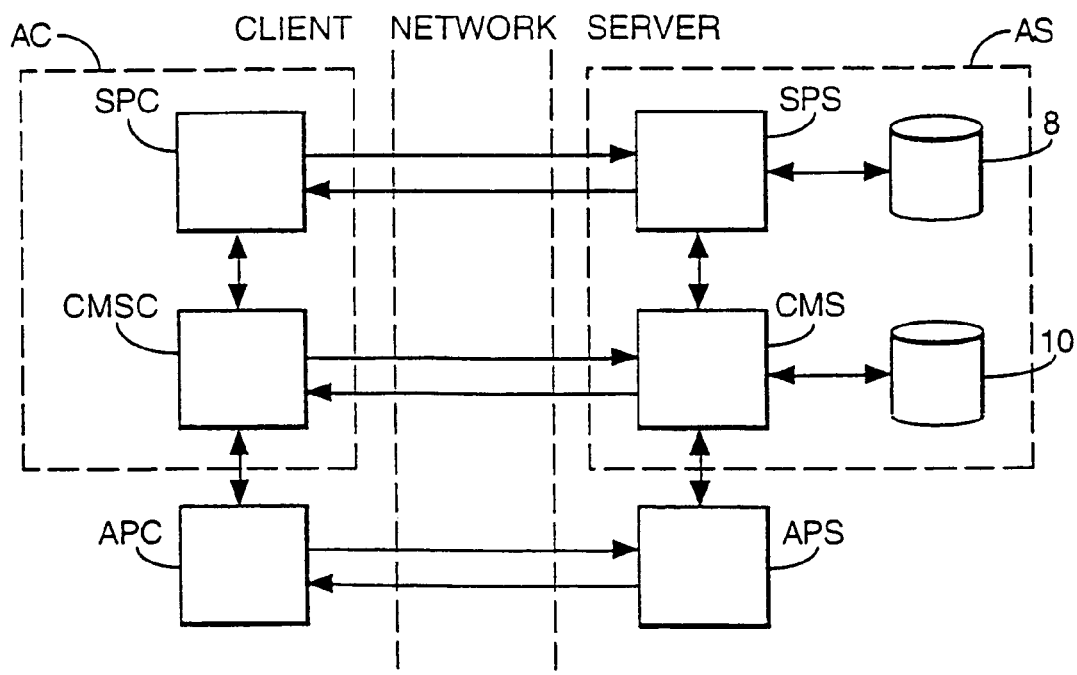
FIG. 2 is a block diagram schematically illustrating the client/server communications between a client terminal and servers provided in accordance with the present invention.

FIG. 2 is a block diagram illustrating the data communications which occur when a user wishes to access one of the application servers APS. The terminal contains software applications which include an authentication client (AC) consisting of a secure password client (SPC) which communicates with the SPS over the Internet using TCP/IP, and a cache management server client (CMSC), which communications with the CMS over the Internet using TCP/IP. The terminal also includes at least one application client (APC) which communicates with the application servers APS using TCP/P or UDP/IP.

The SPS has an associated data store 8 which holds authentication details for each of the users authorized to have access to the application servers APS and a token identifying the access rights of each user. The CMS has an associated data store 10, which holds details of users currently logged on for access to the application server APS, and which maintains logging on histories for users once they are logged off.

FIG. 2 illustrates the essential connections made when a user attempts to access one or more of the application servers APS. Communications between the SPC and SPS concern password-based authentication procedures. Communications between the CMSC and the CMS provide a mechanism for ensuring that a user remains logged-on to the system when active, and for logging off a user when the user has become inactive. Communications between the APC and the APS provide the resources which the user wishes to access. The APS may be a World Wide Web (WWW) server, in which case the application client is a WWW-enabled browser, such as Netscape Navigator (trade mark) and Microsoft Internet Explorer, using the Hyper Text Transfer Protocol (HTTP) specification to retrieve documents from the application server. Alternatively, the application server APS may be a server providing documents using the file transfer protocol (FTP), in which case the application client APC is an FTP-enabled client. However, the application servers APS may be any type of Internet resource server, and the terminals T1, T2 are preferably provided with corresponding types of application clients such that a user may access any of the available application servers APS from that terminal.

As will be discussed in greater detail below, the authentication procedure followed by the SPC and the SPS also provides a session key for use by the application client/ application server combination during the course of the session following log on. This will be explained in greater detail below. Next, the authentication of a user at a terminal of the class T1 or T2, and subsequent access by the user to one or more of the application servers APS will be described.

Figure 3:
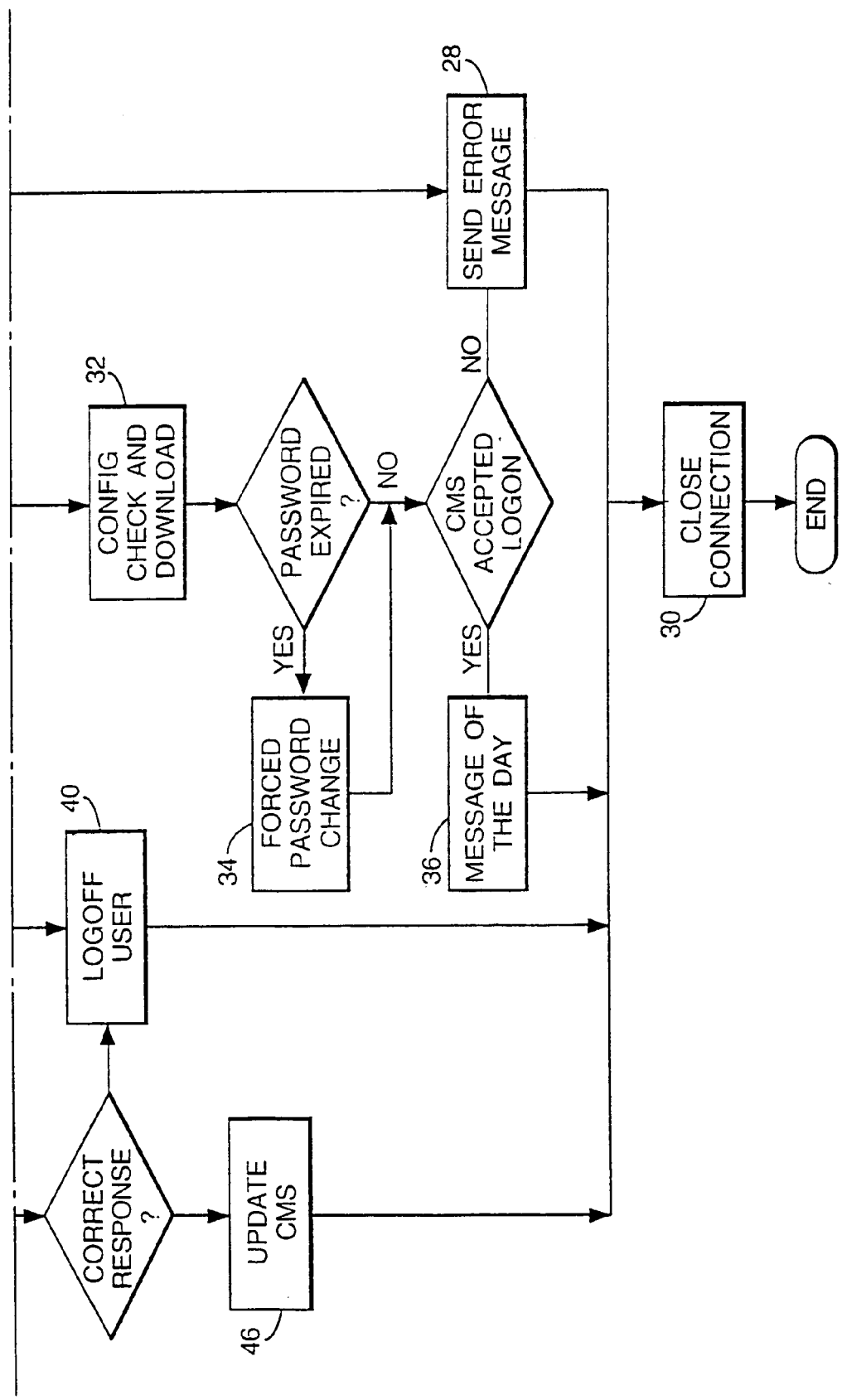
FIG. 3 is a flow diagram illustrating an authentication procedure.

FIG. 3 shows the log on procedure sequence followed by the SPS during logging on of a user from either of terminal T1 or T2. When a user at a terminal having a unique IP address wishes to access any of the application servers APS, they must complete a secure challenge-response log on process using the SPC. To initiate the log on process, the SPC opens a connection to the SPS, to which the SPS sends an acceptance greeting, step 20. This may be followed by a short query sequence during which the SPC sends a message to the SPS indicating the authentication protocol it intends to use, and the cryptographic code used by the SPC. If the SPS does not support the protocol or the code, the SPS will close the connection.

The SPC initiates the log on process, by sending the log on request and the username input by the user at the terminal, step 22.

To authenticate the user, a challenge/response dialogue occurs between the SPC and the SPS, step 24. The SPS generates a challenge which is sent to the SPC. The challenge consists of a random sequence of bytes generated by the SPC using a cryptographically secure random number generator, (i.e. one of which the output is extremely difficult to predict), which is sent as part of a "challenge" message to the SPC.

Figure 4:
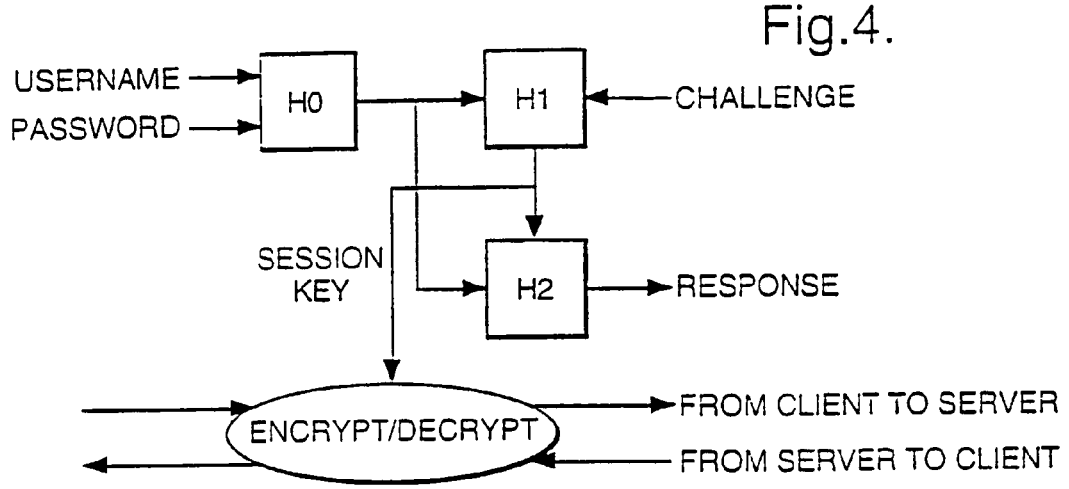
FIG. 4 is a block diagram schematically illustrating an authentication response, and session key, generating algorithm.

At this stage, both the SPC and the SPS perform the algorithm illustrated in FIG. 4 which generates both a response to the challenge and a session key which may be used to encrypt and decrypt data sent to the terminal during the remainder of the session. The response and session key generation algorithm involves the hash functions H0, H1 and H2. Each of these is a one-way hash function, H(M), which operates on an arbitrary length message M and returns a fixed length hash h (often referred to as a "fingerprint" or "message digest" of message M). To guarantee security, the one-way hash functions have the following properties:

1) given M, it is easy to compute h;
2) given h, it is extremely difficult to compute or find M such that H(M) h; and
3) given M, it is extremely difficult to compute or find another message, M' such that H(M')=h.

On the client side, the username and password are input by the user into the terminal, and the SPC combines the two and performs the hash function H0 to produce a first hash. The first hash is combined with the challenge received by the SPC from the SPS and input to a second hash function H1 to produce a second hash. The second hash is stored by the SPC for use as the session key to be used in secure communications during the remainder of the sessions. The second hash is also combined with the first hash and input into the third hash function, H2, to produce a third hash. The third hash is returned to the SPS in a response message as the response to the challenge.

The SPS database 8 contains, against each username entry, the first hash produced by the operation of the hash function H0 on the username and password. The password is thus stored in hashed format, rather than in plaintext, on the SPS database 8, to protect the password from parties who may have access to the database 8. On issuing the challenge, the SPS performs the algorithm shown in FIG. 4, to produce the session key and to compute the response which is expected from the SPC. If the response received from the SPC matches that computed independently by the SPS the challenge/response procedure is successfully completed. However, if the correct response is not received, the SPS will allow the user a retry, step 26. Once a certain number of retries have failed (e.g. 3), the SPS sends the SPC an error message, step 28, and closes the connection with the SPC, step 30.

Notably, by use of the challenge/response sequence described, a session key, being a secret which is shared between the SPC and the SPS, is generated without once sending the session key across the Internet.

In the next step of the log on procedure, the SPC sends a message to the SPS indicating the versions of the configuration files of software installed, which describes the name and version number of the operating system (DOS, Windows, MacIntosh, Acorn RISC OS etc), and the files which the SPC and CMSC contain. If the files are not up to date, the SPS transmits the latest versions to the SPC. These files may be encrypted with the session key generated in step 24, which the SPC decrypts and stores.

The session key generated during the challenge/response dialogue is an encryption key used in a symmetric block encryption algorithm, such as IDEA, or DES. The algorithm performs block by block encryption and decryption on the fly. In this embodiment, the algorithm uses a 64-bit block cipher although other block lengths may be used for stronger or weaker encryption as desired. A checksum is added and encrypted, to allow checking of data to be performed on the SPC side and to allow the SPC to request retransmission of blocks in which an error has been found. The authentication details stored in the SPS database 8 may include an expiry date for the validity of the password used by the user during authentication. If so, and the password has expired, the SPS initiates a forced password change, step 34, using password change procedures to be described below before the log on details are passed on to the CMS.

Once the user has been authenticated, the CMS receives a log on notification from the SPS. In addition to the authentication details, the SPS database 8 stores the session key generated during authentication and a token identifying the access rights against each username, which are also passed on to the CMS upon log on.

As explained above, the CMS manages a cache 10 holding the details of all users which are currently logged-on to the system. The details passed from the SPS to the CMS in the log on notification include a unique identifier for the user terminal, the hash (produced by H0) of the username and password, the session key generated during authentication, the access rights token of the user and the current IP address of the user.

The CMS checks the number of users concurrently logged-on having the same username and password hash. If this exceeds a preset concurrency limit (for example, to ensure that only one instance of a given user is logged-on at any one time), and if the concurrency limit is exceeded, an error message is sent to inform the user that they will not be logged-on, step 28, and the connection is closed, step 30. Otherwise, the user is accepted as logged-on by the CMS, and the SPC sends a "message of the day", step 36, and closes the connection, step 30.

At this point, the user is fully logged-on in a CMS, with the log on notification details stored in the CMS store 10. The user may then, via an appropriate application client APC access one or more of the application servers APS which the user is authorized to access, as specified by the access right token.

When the application client APC sends an access request to an application server, as shown in FIG. 2, the request contains the unique IP address of the user terminal, T1 or T2. The application server APS then sends a log on check to the CMS, via the secure link 6, including the IP address of the user.

The CMS checks whether that IP address is present in the stored list of currently logged-on users. If so, it checks the access rights token stored against the same user, and if the user at that IP address is both currently logged-on and has access rights to the application server in question, the CMS returns an access allowed message to the application server. Otherwise application server APS receives access denied message from the CMS and, if the application client has requested a connection, the application server refuses the connection, or if the application client AC has requested a document to be sent, the application server does not send the requested document.

Once a user is logged-on to the system via the SPS, the CMS performs a periodic check that the user remains logged-on, using a challenge/response procedure similar to that used during the initial authentication of the user. The procedure used by the CMS will depend on the type of terminal at which the user is logged-on, in particular whether the CMS is able to contact the terminal to open a connection with it over the Internet (which is not possible for terminals of the class T2).

Once a user is logged-on to the system via the SPC, the user may initiate a password change, or a log off request using the SPC. If the user wishes to log off, the SPC sends a log off request to the SPS, step 38, to which the SPS responds by sending a log off notification to the CMS, which will then remove the user from the list of logged-on users. The CMS also updates the log on history for the user, storing the log on time, for billing purposes.

If the user wishes to change their password, or the user is forced to change their password, the SPC prompts the user to enter a new password, which the SPC combines with the username and performs the hash function H0 to produce the first hash of the hash in algorithm shown in FIG. 4. This hash of the username and password is then encrypted with the session key generated during authentication and sent to the SPS. The SPS decrypts the hash and stores it in the SPS database 8.

Notably, the new password is sent in hashed form and encrypted, to avoid the password being read at any stage during the password change procedure, step 42.

The SPS then initiates a challenge/response procedure as described above, to re-authenticate the user, step 44. If an incorrect response is received by the SPS, the user is logged-off, step 40, and the log on history of the user is updated. If the correct response is received, the log on status of the user is updated in the CMS, step 46, and the connection is closed, step 30.

Figure 5:
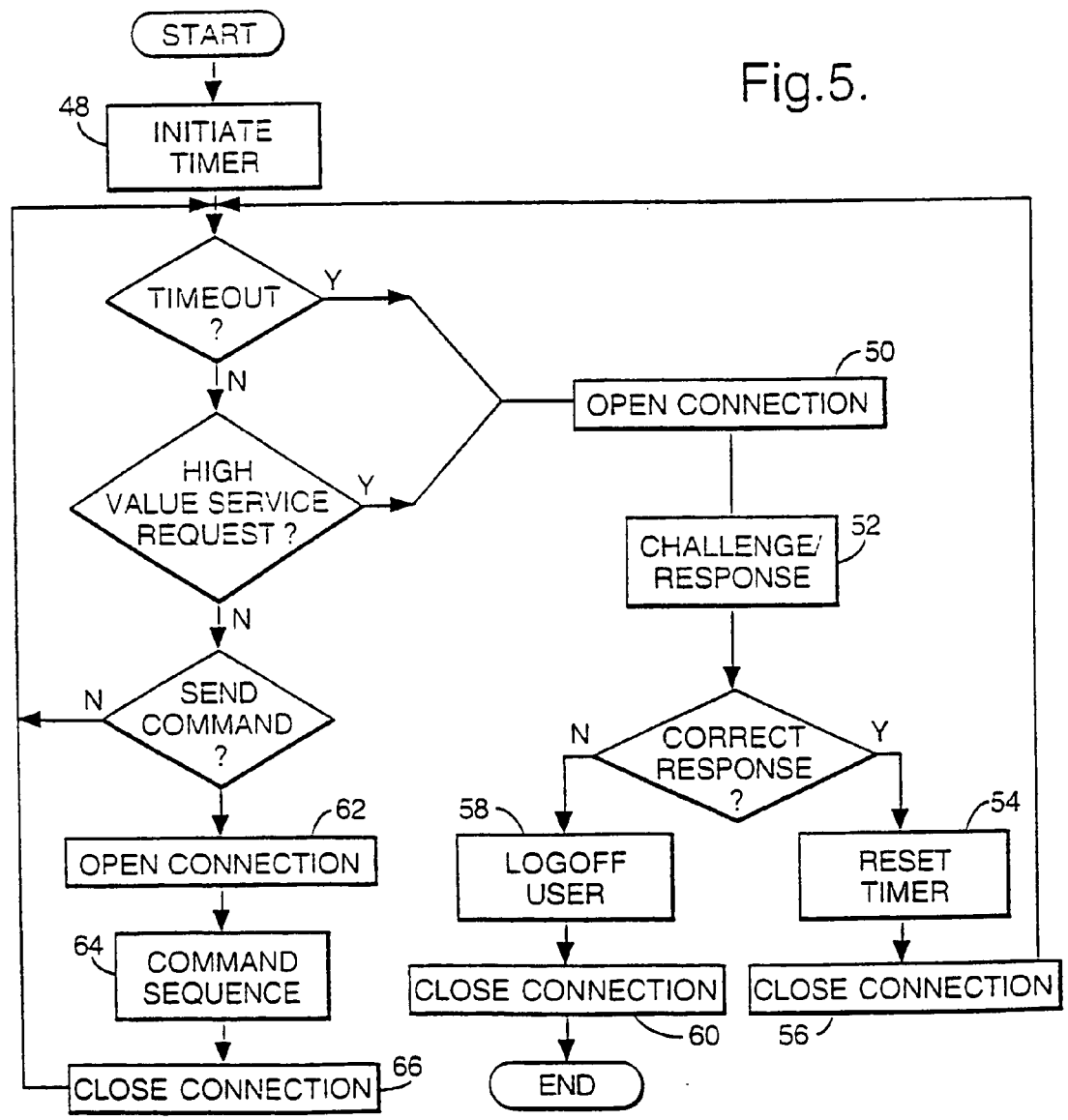
FIG. 5 is a flow diagram illustrating procedures carried out by a server maintaining an updated list of user authentication statuses.

With terminals of the type T1, which will allow a connection to be opened by the CMS over the Internet, a procedure as shown in FIG. 5 is followed by the CMS after log on.

When a user is first logged-on, or when the CMS receives a log on update from the SPS, the CMS initiates a timer for that user, which operates to ensure that users are logged-off after a period of inactivity, for example 5 minutes. After the timer is initiated in step 48, if the timer times out, or when a high value service is requested from one of the application servers APS, the CMS opens a connection with the CMSC, step 50. The CMSC then initiates the challenge/response procedure using a new randomly-generated challenge, step 52. The response by the CMSC is computed by the SPC.

If the response returned by the CMSC matches that computed by the server, then the CMS resets the user's timer, step 54, and closes the connection, step 56. The encryption key generated during the calculation of this response is discarded, so that the session key generated during the initial authentication procedure, or the key generated during the password change procedure, is maintained for encryption purposes.

If the response returned by the CMSC does not match that computed by the server, then the user is logged-off the CMS, step 58, the log on history of the user is updated, and the connection is closed, step 60.

The CMS is also able to send commands to users at terminals of the class T1. To send a command, the CMS opens a connection with the CMSC, step 62, and performs a command sequence, step 64, before closing the connection, step 66. Various command sequences are provided for.

The CMS may request a file from the SPC, by sending a "send file" command, which includes the name of the file to be sent. The SPC then sends the original size of the file, the total number of bytes that will be sent, and the encrypted contents of the file to the CMS. The CMS may also download files to the CMSC, with a "receive file" command which includes the file name to be sent. The CMSC displays a file browser to the user to allow the destination of the file to be chosen and to change the name of the file. The CMS then sends the content of the file in encrypted form.

The CMS may also retrieve a list of files and directories in a given directory from the CMSC. Once the CMS has opened a connection, a "get directory" command is sent, including the name of the directory to be retrieved. The CMSC then sends a list of files and sub-directories in that directory.

Figure 6:
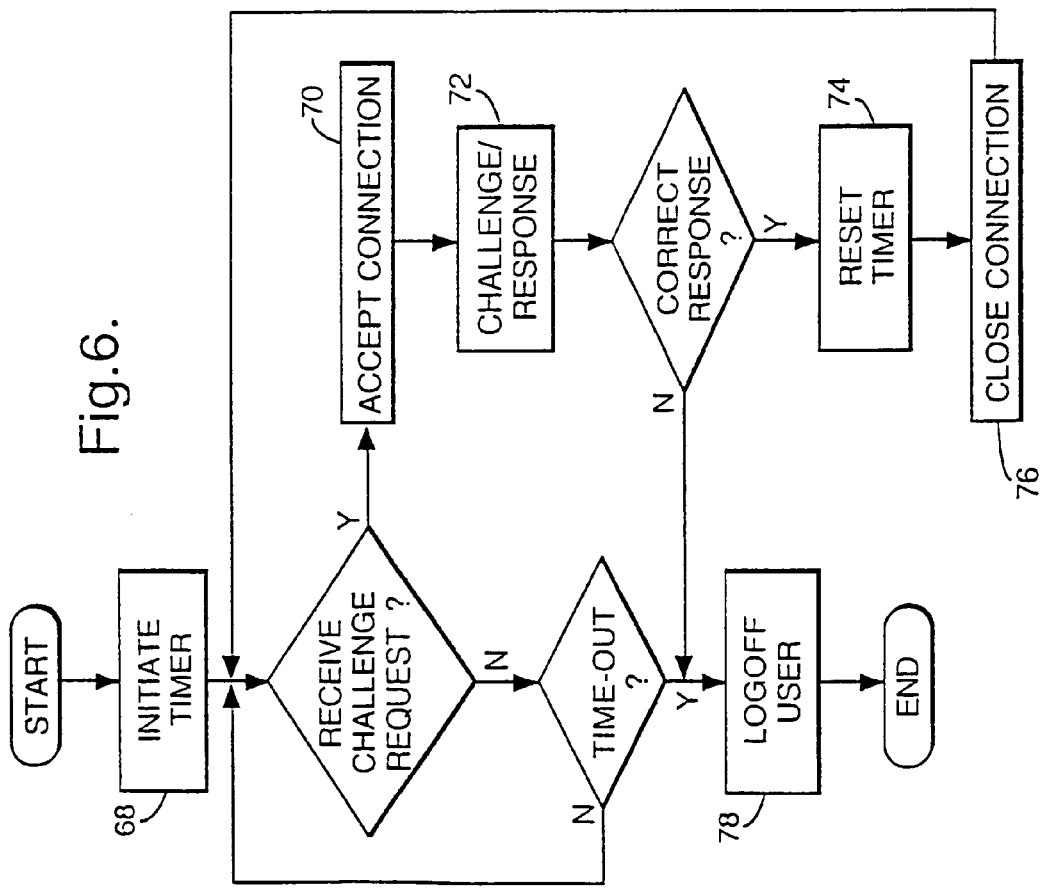
FIG. 6 is a flow diagram illustrating further updating procedures carried out by the server maintaining a list of currently authenticated users.

The CMS may also send a message to the SPC containing the initial password of a new user. When a new user account is created in the SPS, the CMS opens a connection and sends the new password, which is randomly generated, in encrypted form to maintain the security of the system.

Where no connection opening path exists from the CMS to the CMSC, as in the case of the class of terminals T2, a procedure as illustrated in FIG. 6 is followed to update the log on status of the users in the list of logged-on users in the CMS. When a user is initially logged-on in the CMS, or when a log on update is received from the SPS, the CMSC initiates a timer allocated to the user, step 68. In order to maintain the log on status of its user, the CMSC periodically contacts the CMS, with a frequency somewhat greater than the frequency of time-out of the user's timer, to perform the updating. The CMS then accepts the connection opening request from the CMSC, step 70, and initiates a challenge/response procedure similar to that used in the initial authentication process, step 72. If the correct response is received, the user's timer is reset, step 74, the connection is closed, step 76, and the encryption generated during the challenge/response procedure is discarded.

If however no challenge request is received from the CMSC within the time-out period, the CMS acts to log off the user, step 78, and updates the user's log on history. Once logged-off, the user can no longer access any of the application servers AS of the system.

The authentication scheme described in relation to users at terminals T1 or T2 described above involves identification of a user, after initial authentication, by the IP address of the terminal at which the user is logged on. Because the CMS performs periodic re-authentication of the user, it is difficult for a third party to impersonate the user by IP address spoofing. Namely, even if a third party were to spoof the IP address of the user, the third party would only have access to the real user's resources for the time provided by the user's timer in the CMS. Once the timer has expired, the third party forming the IP spoofing would not be able to re-authenticate, without access to the user's password. Since the user's password is only ever sent across the Internet when a password change occurs, and even then in encrypted form, a third party has no means of finding out the password of an authorized user.

Figure 7:
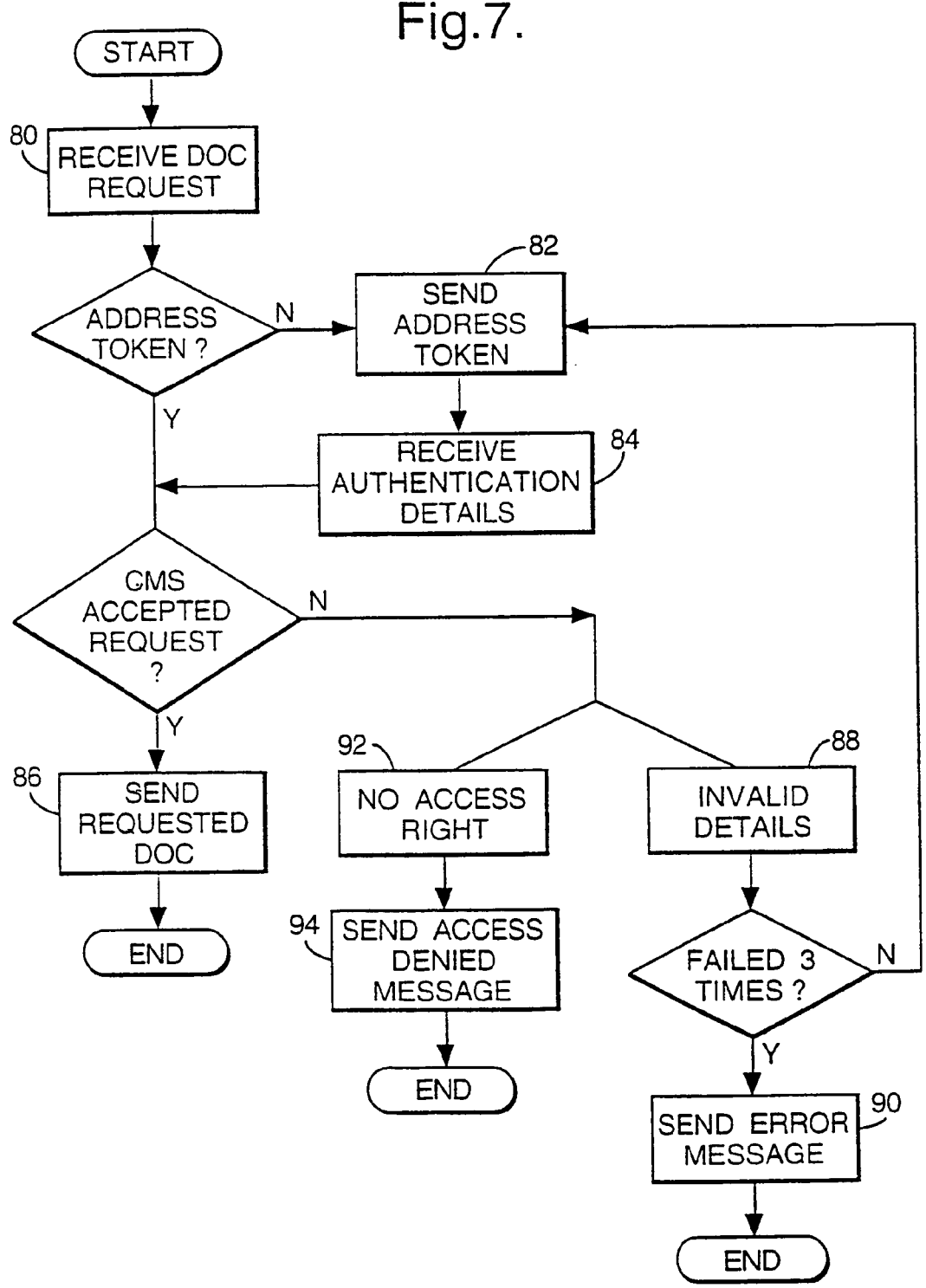
FIG. 7 is a flow diagram of authentication procedures carried out by an application server in accordance with a further embodiment of the invention.

Since the class of terminals T3 individually have no unique IP address, a different authentication scheme is provided, as illustrated in FIG. 7. A user at a terminal T3 logs on to the system via an application server APS designated as an authentication server. In the following, each of the application servers exemplified is a WWW server, using HTTP to format communications with the application client APC. Furthermore, the designated authentication server is preferably SSL (secure socket layer) enabled, to allow secure passing of an authenticator (to be described) from the application client APC to the server, using the SSL encryption protocols. However, it will be appreciated that a similar authentication scheme may be implemented in other types of network server, using different network communications protocols.

The application client APC in this case is a WWW browser, such as a Netscape Navigator, or Microsoft Internet Explorer (Trade Marks) browser. In order to access the application server, the application client sends a request for a document over the Internet. In order to identify and locate a document in any WWW server, files are identified by a universal resource locator (URL). The URL is structured to identify the service protocol (which in this case is HTTP), the "domain" of the Internet server, the directory of the file in the Internet server, and the file name. The URL structure is as follows:

HTTP://domain/directory/file name.

This authentication scheme uses the functionality of packets of information sometimes referred to as "client-side persistent information" but more commonly referred to as "cookies". Cookies may be sent from a WWW server, embedded in a HTTP document sent on request by that server. On receiving a cookie, the browser automatically stores the information in the cookie, and automatically transmits the information in a document request whenever the browser is attempting to retrieve a document from a server in the same domain as the server from which it received the original cookie. The application client APC used in the present embodiment is a browser which supports cookies, such as those mentioned above.

A cookie is an item of information which is sent to the requesting browser when a certain page on the Web server is accessed. The cookie information is itself placed in the HTTP header for the page, before the <HTML> tag. A cookie may contain the following five fields:

1) NAME=VALUE. This is the only compulsory field.
2) expires=DATE. The date may not be given. If an expiry date is not specified, the cookie will expire when the user's current session ends.
3) path=PATH. This gives the base path on the server for which the cookie is valid. If not given, the default is the same path as the document originally providing the cookie.
4) domain=DOMAIN_NAME. This specifies the Internet domain or domains to which the cookie will be returned in document requests. If not given, the default is the same domain as that of the server originally providing the cookie.
5) secure. If the word "secure" is included in the cookie, it will only be sent to a server using SSL (secure socket layer) protocols.

In this case, since the user has no unique IP address, an application server sends the application client APC a cookie containing in the "NAME=VALUE" field an identifying tag for the user, referred to herein as an address token since it replaces the IP address as the means for identifying the user, which consists of an effectively unique large number which is either randomly generated or is serially incremented each time a new cookie is generated. The application client APC stores the cookie and prompts the user to enter their username and password. The application client APC then returns the address token along with the username and password, whereby the application server APS performs authentication of the user via the CMS and SPS.

FIG. 7 shows the event sequence in terms of actions taken by the application server APC during authentication of a user based at terminal T3. When the application server APS receives a document request, step 80, the APS checks whether the request contains an address token as a result of a cookie previously being sent to the application client APC. If the document request contains no such address token, the application server sends the APC a cookie containing a newly generated address token, which the APS also stores as an as yet unvalidated address token, step 82.

In return, the APS receives the authentication details from the APC, step 84, including the same address token, whereby the user is re-identified, and the username and password, on which the SPC performs the first hashing function H0 illustrated in FIG. 4. This information is passed on to the CMS, which polls the SPS to check whether the username and password hash matches one stored in the SPS store 8 as that of an authorized user.

If the authenticator returned by the APC is one of a valid user, and if no concurrency limits are exceeded on the number of users having the same user authenticator in the CMS store 10, the CMS retrieves the user's access rights token from the SPS store 8. If the access rights token then indicates that the user is allowed access to the application server to which the log on attempt is being directed, the CMS sends an access allowed message to the APS, and stores the address token and the authenticator of the user and the access rights token in the CMS store 10. On receiving the access allowed message, the application server sends the requested document, step 86, along with an updated cookie containing the new validated address token and the username and password hash, which is stored on the hard drive of the client terminal as a current cookie. The "expires=DATE" field of the cookie is left blank, such that when the user closes down the browser at the end of a session, the cookie is discarded and the same or other users subsequently using the terminal need to re-authenticate.

If however the CMS, on checking the details in the SPS, determines that the authentication details supplied by the user are invalid, step 88, the APS receives an access denied message and generates a new address token and sends a new cookie to the application client. The new address token contains a flag indicating that the user has failed already once to provide correct authentication details, which flag is incremented each time the user fails to authenticate. Once the user has failed three times to authenticate, the APS sends an error message to the APC, indicating that the user will not be logged-on, step 90.

Thus, any document requests subsequently transmitted to the designated authentication server by a logged-on client terminal will contain the previously sent cookie including the validated address token and the username and password hash. The username and password hash serves as an additional means of identifying the user and preventing address token guessing attacks, but is not necessary since the address token uniquely identifies the user terminal. In any case, referring to FIG. 7, such a document request received at the designated authentication server is validated as a request from a logged-on terminal by means of the information contained in the returned cookie accompanying the request, step 80, and the requested document is sent in reply.

The other of the application servers APS in the system receiving such a document request may also check with the CMS that the user terminal is logged-on, since, with the cookie properly configured, the document request sent to those other application servers also contains the cookie stored on the client terminal. As long as the cookie contains a valid address token, the other application servers also return documents as requested. If however a document request arriving at the other application servers is not accompanied by a cookie containing a valid address token, the requesting browser is redirected to the Web server designated as the authentication server to authenticate.

If the CMS determines from the access rights token received from the SPS database 8 that the user is not entitled to access the application server to which a document request is directed, step 92, the application server sends an access denied message to the application client indicating that the user is not entitled to log on to that particular APS, step 94.

Figure 8:
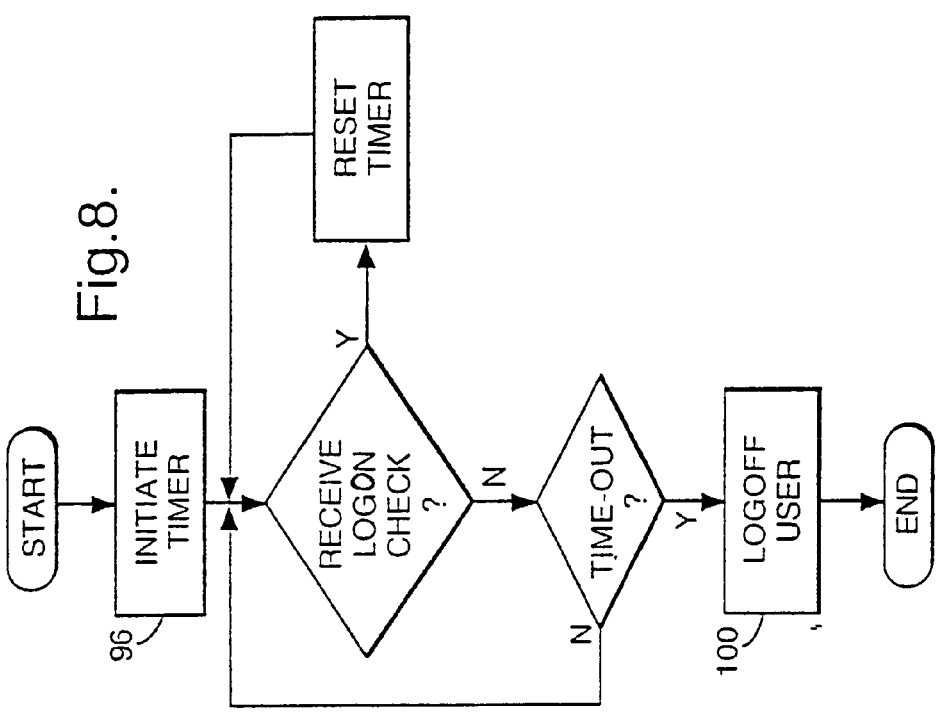
FIG. 8 is a flow diagram illustrating an authentication status update procedure.

FIG. 8 illustrates the procedure followed by the CMS in order to update the current log on status of a user accessing via the terminal T3. When the user initially logs on, the CMS initiates the user's timer, step 96, which is set to log off the user after a set period of inactivity, for example 5 minutes. If during that time, the CMS receives a log on check from any of the application servers APS, due to a request of resources from the user, the CMS both confirms to the APS that the user is logged-on, identifying the user by means of the address token in the returned cookie, and resets the timer, step 98. After the period of set inactivity, the timer times out and the user is removed from the stored list of currently authenticated users by the CMS, step 100. As the user is logged-off, the CMS updates the log on history of the user, for billing purposes.

The cookie is configured such that a browser will send the cookie to any of the application servers within the same domain as an application server which initially supplied the cookie, the application servers of the present embodiment are preferably located in a common Internet domain. However, a similar functionality could be provided by servers in multiple domains, by configuring the cookie to be sent to any of the application servers within the system, or by sending multiple cookies for application servers in different domains.

Figure 9:
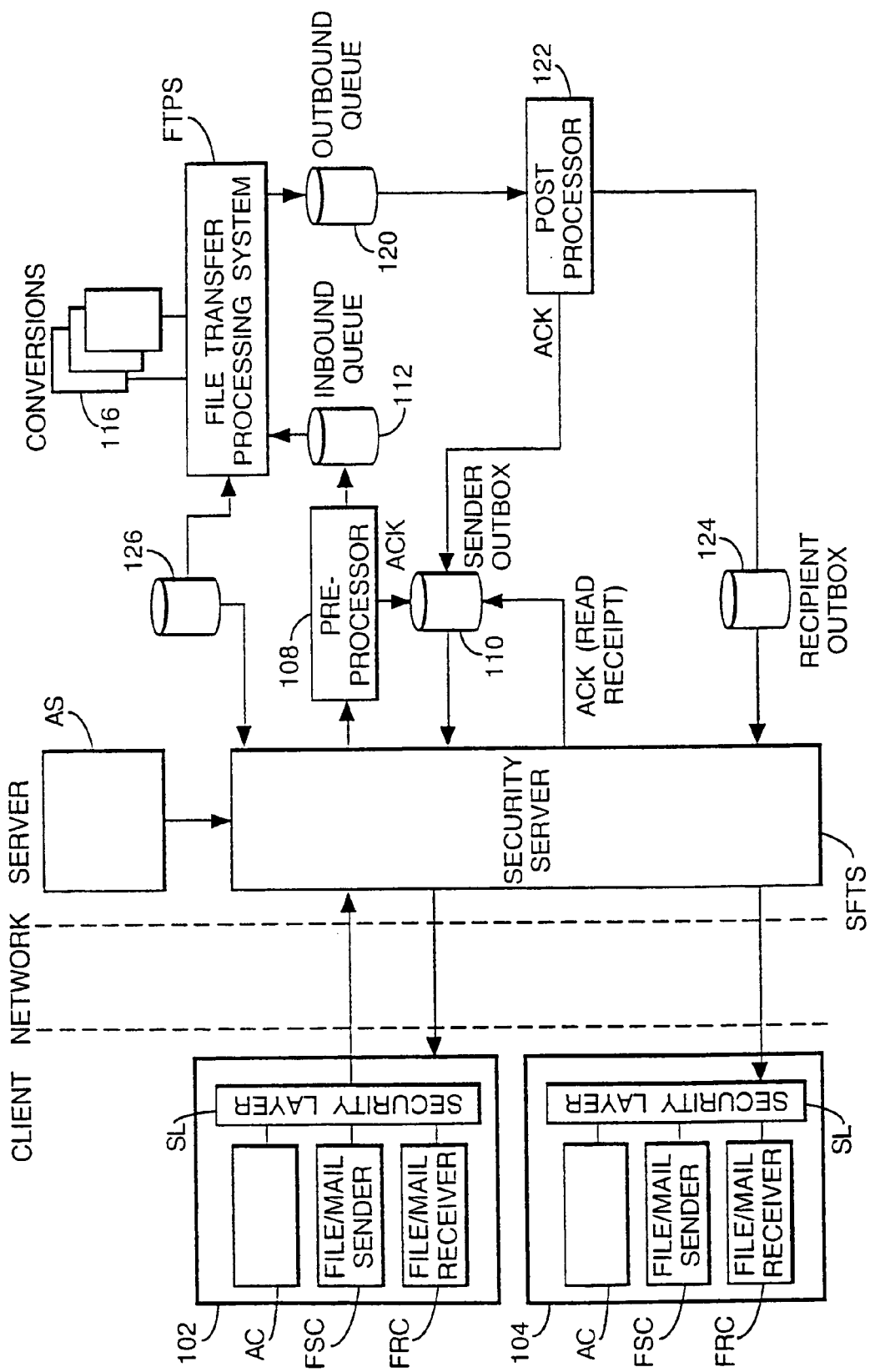
FIG. 9 is a block diagram schematically illustrating a file transfer system in accordance with an embodiment of the invention.

FIG. 9 illustrates a particular embodiment of application server, referred to as a secure file transfer server (SFTS), which may be used in the system of the present invention to transfer files between a first client terminal 102 and a second client terminal 104.

Each of the client terminals 102, 104 are of the terminal class T1 or T2. During log-on to the system using the described interactions between their respective authentication clients AC and the authentication server AS of the system, a session key is generated which is used for encryption and decryption of files which are to be transferred between the client terminals 102, 104 and the security server 106. In this embodiment, the client terminals 102 and 104 each include two application clients, namely a file/mail sender client (FSC) and a file/mail receiver client (FRC). Encryption/decryption of files takes place in a security layer (SL) using the session key stored in the authentication client AC after log-on of the user.

The SFTS interrogates the authentication server AS whenever service is requested from either of the client terminals 102, 104, to check that the user at the terminal is currently logged-on to the system, and to retrieve the session key from the authentication server.

As shown in FIG. 9, when a file is uploaded from the first client terminal 102 to the SFTS, the file is transferred to a pre-processor 108 which sends an acknowledgement or error message to the sender out box 110 depending on the outcome of the pre-processing. After successful pre-processing, the file is transferred to an in-bound queue 112 of a file transfer processing system (FTPS) on the server side.

When a file is processed by the FTPS, the type of file transfer is determined, and using file transfer parameters stored in a file transfer parameter store 106, the FTPS may perform a file conversion, using one of the plug-in conversion modules 116, before the file is passed on to an outbound queue 120 by the FTPS. When the file leaves the out-bound queue 120, the file is passed to a post-processor 122, which sends an acknowledgement or an error message to the similar outbox 110, depending on the outcome of post-processing. If post-processing is successful, the file is sent to the recipient outbox 124, where it is retrievable by the FRC of the second client terminal 104. When the second client terminal 104 connects to the SFTS to retrieve the file, an acknowledgement or an error message is sent to the sender out-box, depending on the results of downloading to the second client terminal 104. The first client terminal 102 can then access its sender outbox 110 to confirm correct receipt of the file by the recipient terminal 104, on the basis of the acknowledgements posted to the sender out box, or to retrieve an error message and to re-send the file as appropriate.

Figure 10:
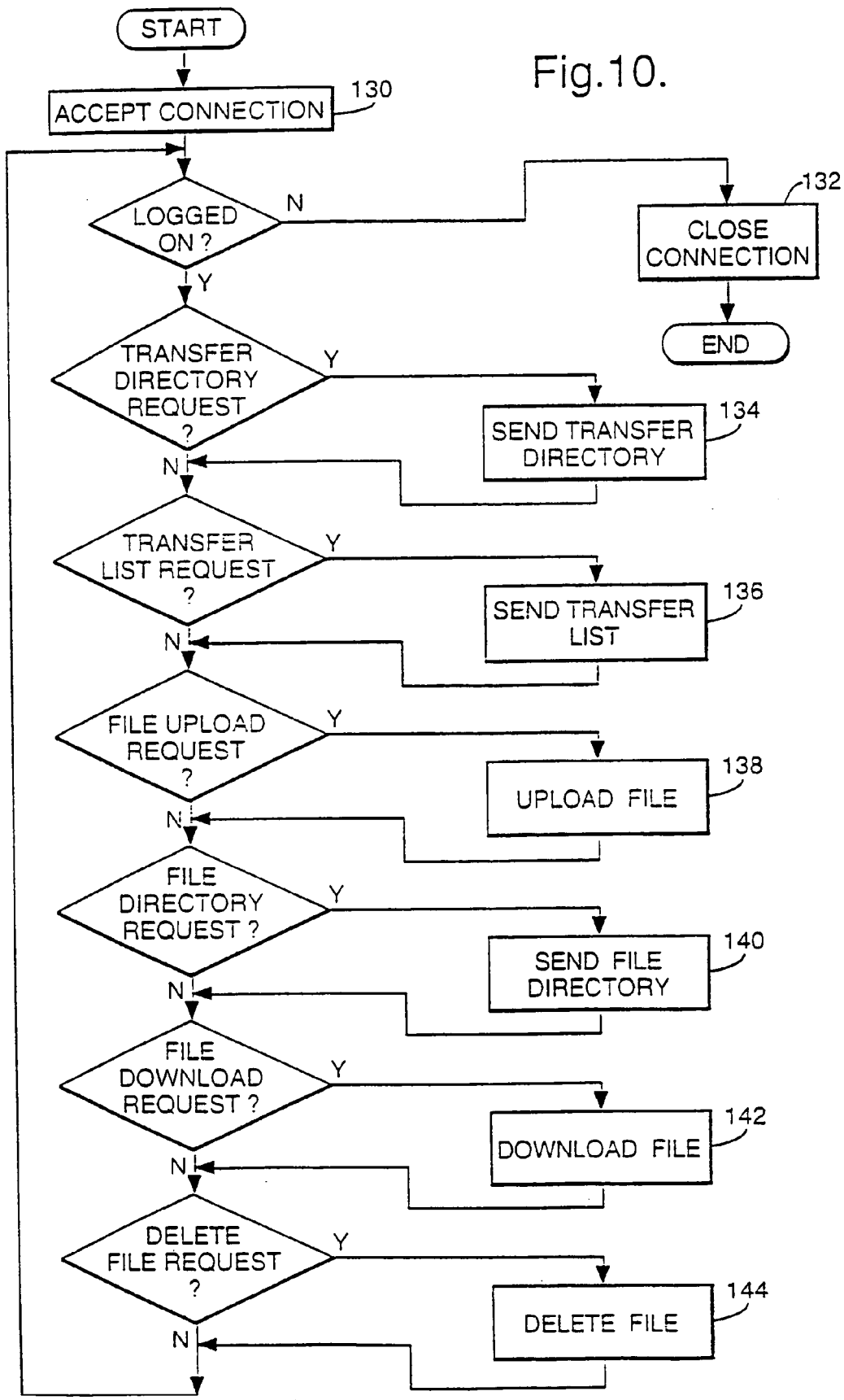
FIG. 10 is a flow diagram illustrating procedures carried out by a file transfer server.

FIG. 10 illustrates procedures followed by the SFTS when contacted by a client terminal which is to upload and/or download files to/from the SFTS.

First, the SFTS accepts the connection request, step 130, which contains the IP address of the client terminal requesting access. Using this IP address, the SFTS checks in the AS whether the user's IP address is stored in the list of logged-on users. If so, the SFTS retrieves the session key stored in the AS for that user, and confirms with the client terminal that the user has access to the SFTS. If not, the SFTS closes the connection, step 132.

Once the client terminal has received an access confirmation from the SFTS, the client terminal may send requests to the server as illustrated in the remainder of the procedure of FIG. 10.

Figure 11:
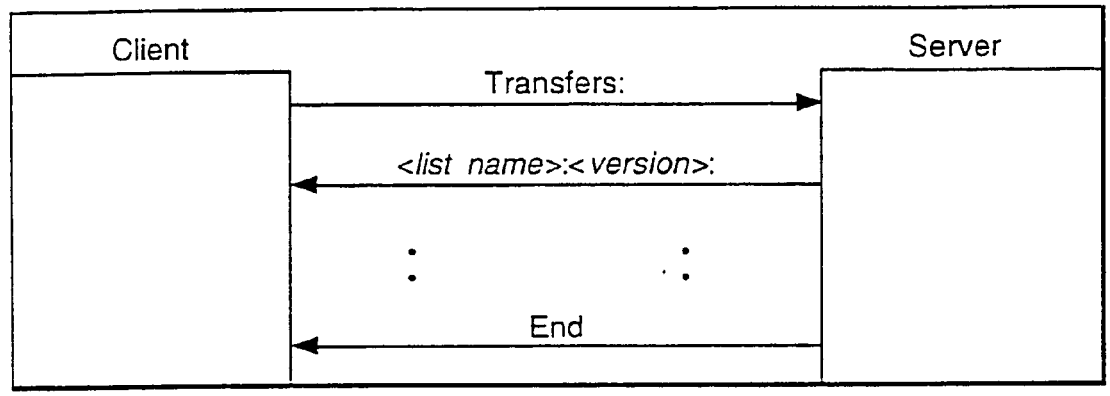
FIGS. 11, 12, 13, 15 and 16 are event sequences illustrating client/server communications.

Each user of the file transfer system is a member of at least one of a number of a Closed User Groups (CUGs), whose members are identified in the file transfer parameter database 126. Each Closed User Group has a list of transfer types for its members to use to exchange files amongst each other. A transfer type is created by an administrator of the Closed User Group, by setting up various parameters for the transfer type including its name and a version number which is incremented every time the transfer is updated. This information is stored in the file transfer parameter store 126, and is used by the server to provide the client terminal with a list of transfers available to the user, by using the command/response procedure illustrated in FIG. 11.

In order to obtain a directory of the transfer lists available, the FSC of the client terminal sends a "transfers" command in response to which the SFTS sends a series of lines containing the names and version numbers of the transfer lists available to that user, step 134, which is then stored in the client terminal by the FSC. Each CUG has an associated transfer list, and each list name provided in the transfer directory is a representative name for its associated CUG, whereby the user identifies the list required.

Figure 12:
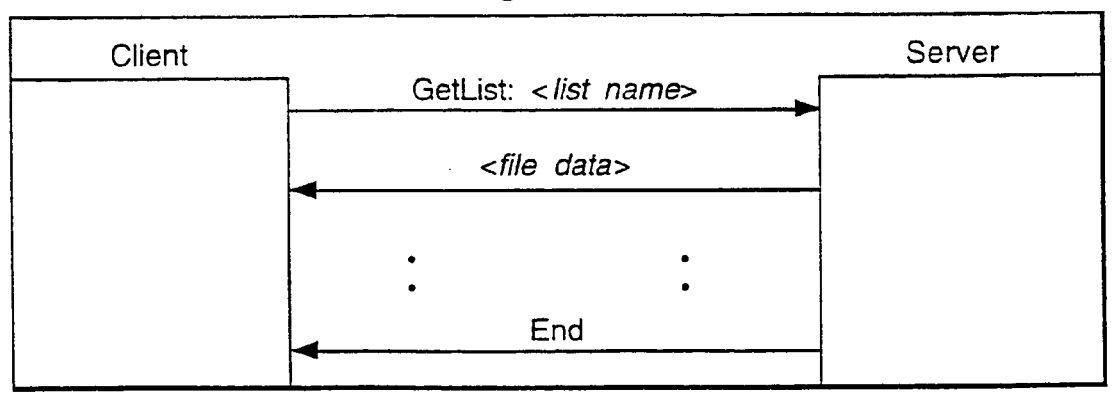

When the FSC detects a list which is new, or one which has been updated, the FSC downloads that list from the SFTS using the "GetList" command, as illustrated in FIG. 12. In response, the SFTS retrieves the file transfer type list from the file transfer parameter store 126 and transmits it to the client terminal. The list received for the CUG in question is stored by the FSC in the client terminal 4 and later used during file transfer.

Each transfer list includes a header indicating the list name and the version number, and a number of transfer types. For each transfer type, the list includes a short name, a longer name, an encryption type indicator, an output directory name, an input directory name, an archive directory name, a file mask, a receipt flag, and a delay flag.

The short name included in each transfer type is a unique short name for that transfer type, which is sent during client/server file transfers to identify the transfer type. The longer name of each transfer type is a descriptive name which is displayed to the user to allow the user to identify and select the transfer type.

The encryption type indicator in each transfer type has three possible settings, namely "none", "normal" or "delayed". If the indicator is "none", no encryption is used during upload/download of files. If the indicator is "normal" the files are encrypted/decrypted during upload/download from the SFTS by the security layer of the client terminal and by the SFTS itself. If the indicator is "delayed" the files are encrypted/decrypted during upload/download from the server, as is the case for "normal", and the file is also encrypted a second time prior to transmission with an "embargo" key, to be described later.

The output directory name is a suggested directory where files for this particular type of transfer are to be retrieved from for sending. When selecting files for upload the FSC takes the user to this directory, although the user is still able to select files from a different directory.

The input directory name is a suggested directory where files for this particular type of transfer are to be stored on receipt. When downloading a file, the FRC places the file in this directory unless otherwise specified by the user.

The archive directory is a suggested directory where files of this type of transfer will be moved to in the sending terminal system after a successful upload. Again, the user can choose a different archive directory if desired.

The file mask for each transfer type defines a file selection mask which guides the selection of files for transfer using this transfer type. If a transfer requires multiple file selection masks, multiple file mask entries are specified.

The receipt flag is set either at "Y" or "N". If "Y" an automatic acknowledgement is required from the server when the file is pre-processed, delivered for download and downloaded by the recipient, respectively. If "N" no acknowledgement is required.

The delay flag for a transfer type may be "Y", or "N". If "Y" files of this type will be delayed by storing the file in the recipient outbox 124, and made available for delivery only after a date which is specified by the user. If "N", the files are made available in recipient outbox 124 without delay.

Figure 13:
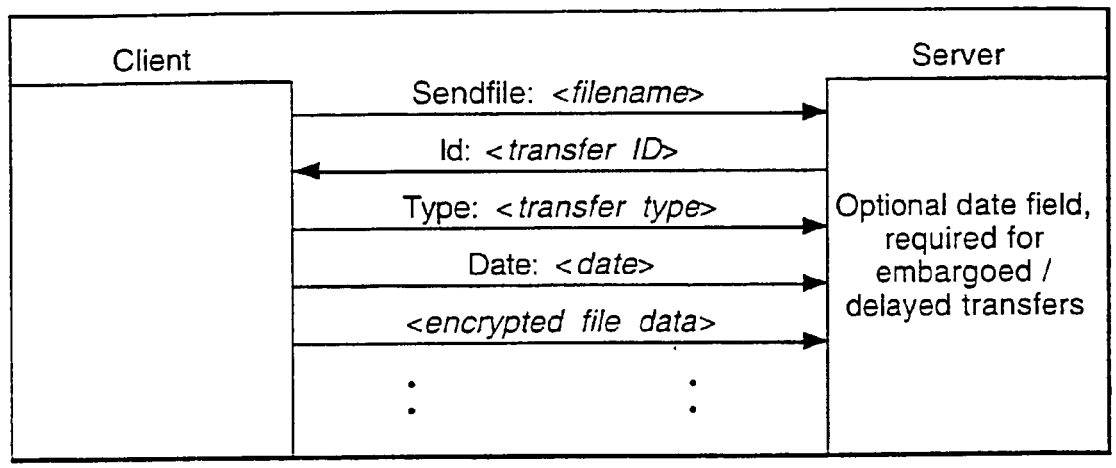

Once the terminal is sent any new transfer list, the user is able to request a file to be uploaded to the SFTS, using the command/response procedure illustrated in FIG. 13. The FSC initiates the transfer by sending the "sendfile" command with the name of the file to be uploaded (with any directory pre-fixes removed) and the identity of the intended recipient(s). The SFTS will generate a unique ID for this transfer which is then sent to the client terminal. The transfer ID is used by the server to identify a file throughout the transfer process and provides a means of preventing errors which would other wise occur with duplicate file names.

Once the transfer ID has been assigned, the FSC sends the SFTS headers specifying the chosen transfer type, the original size of the file (in bytes), the total number of bytes that will be sent (including the overhead from the encryption process), and an optional date which represents when a file may be released (if using embargoed encryption) or when a file should be made available for delivery (in the case of deferred transfers).

Figure 14:
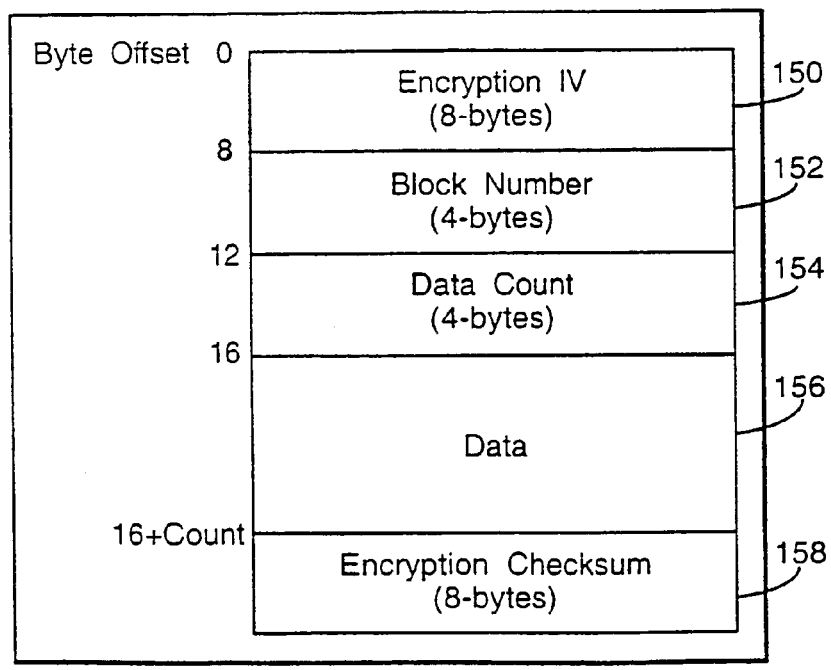
FIG. 14 is a block diagram illustrating a data transmission block in accordance with an embodiment of the invention.

When the headers have been sent, the encrypted file data is sent to the server as a series of blocks having the configuration illustrated in FIG. 14.

Each data block includes five parts, including an initialization vector 150 for the decryption process, added during encryption and prior to transmission of the block. The block also includes a block number, 152, which increments with each block of data sent, and a data count 154, which is a count of the number of data bytes included in the data block, excluding the initialization vector 150, block number, data count, checksum and any padding added during the encryption process. The next part of the data block is the part holding the encrypted data 156, which is padded to a multiple of 8 bytes by the encryption function if the data block is not otherwise a multiple of 8 bytes. The final part of the data block is an encryption checksum 158, which is added by the encryption function and checked and removed by the decryption function to ensure that the data block has been received correctly after transmission.

When an uploaded file is received by the SFTS, the file is generally processed by the pre-processor 108, the FTPS and the post-processor 122, and is sent to the outbox 124 of the intended recipient of the file.

Figure 15:
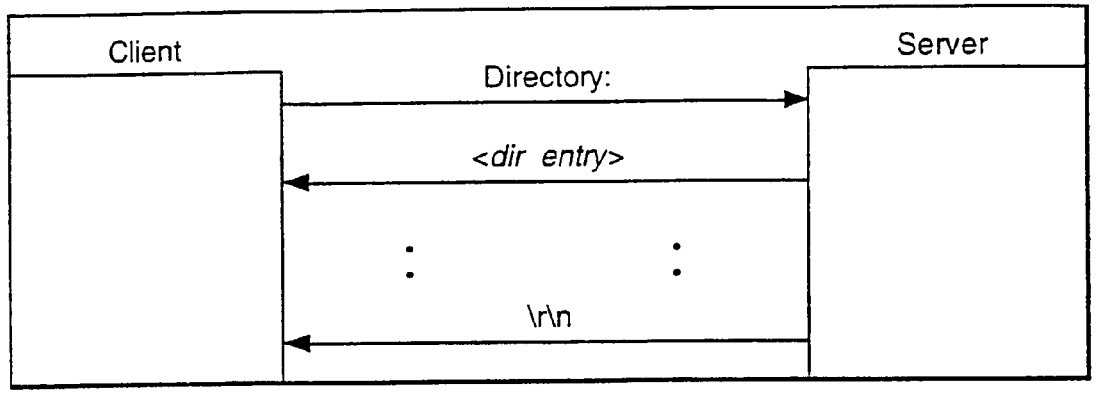

Each recipient outbox keeps an updated directory of files to be downloaded to the recipient, which directory can be downloaded by a receiving client terminal FRC, step 140, by using the command/response procedure illustrated in FIG. 15. If the transfer type indicates a deferred transfer, the file is stored invisibly in the recipient outbox and included in the directory only after the time and date specified in the transfer request.

To obtain a list of files waiting on the server for the user to download (if any), the FRC sends a "Directory" command, in response to which the SFTS sends a directory listing which contains, for each directory entry, the transfer ID assigned to the file when it was uploaded by the sender, the file transfer type, the original name of the file, the original size of the file in bytes, the total number of bytes that will be sent if the file is downloaded, the user ID of the file sender, the date upon which the file was delivered to the user's outbox on the server, an encryption flag ("Y" if the file users embargoed encryption, "N" for other types of transfers), a date/time upon which the embargo key will be released for distribution if the file is embargoed, and a unique identifier for the embargo key used to encrypt the embargoed file, if the file is embargoed.

Figure 16:
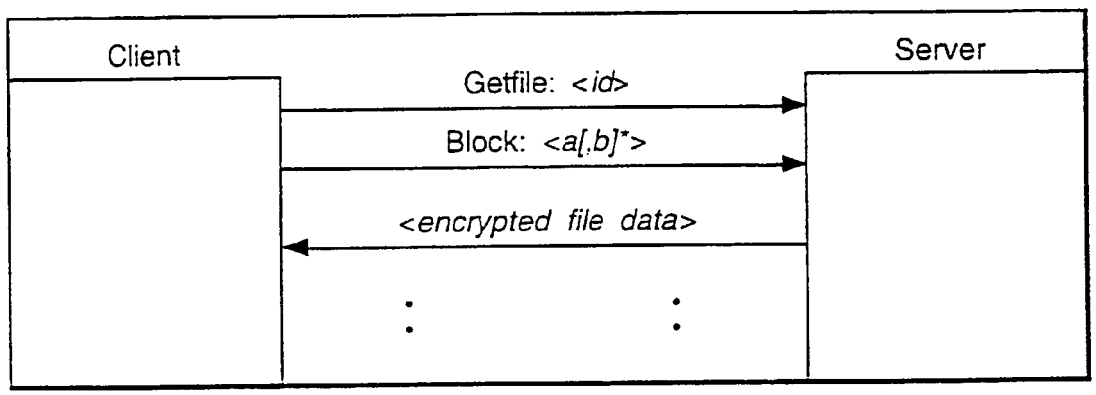

Once the FRC has received a directory of the files waiting to be retrieved the FRC may download one of the files, step 142, using the command/response sequence illustrated in FIG. 16. To initiate the download of a file, the FRC sends a "Getfile" command to the server with the transfer ID as indicated in the directory listing of the file to be retrieved. The FRC then sends the "Block" line to indicate which data blocks are to be downloaded. The "Block" line can indicate a single block number (eg "0"), a list of blocks (eg "0, 1, 2, 5") or a range of blocks (eg "0–9"). To download a file in its entirety, the FRC sends a block line with a block number of zeros. The SFTS then encrypts the file using the session key held for the receiving client terminal, and sends the selected data blocks to the FRC.

At the receiving terminal end, the security layer SL uses the session key to decrypt the file. Should the downloaded file fail to decrypt correctly, the file is retrieved from the SFTS again in its entirety.

For added security on the server side, it is possible to re-encrypt a file with a locally-generated encryption key after decryption using the session key of the sending terminal, and to decrypt the file using the locally-generated encryption key immediately prior to processing by the FTPS. It is also then possible to re-encrypt the file with a further locally-generated encryption key after processing by the FTPS, and to decrypt the file using the further locally-generated encryption key immediately prior to re-encryption of the file using the session key of the receiving terminal.

If a file transfer is of an embargoed type, as well as being encrypted with the session key of the receiving terminal, it is also encrypted by the SFTS using an "embargo" key prior to delivery and assigned an embargo key identifier. This means that once downloaded, the file still cannot be read as it remains encrypted with an encryption key derived from the embargo key after decryption using the session key. The file encrypted using the embargo key is stored along with the embargo key identifier by the FRC in the client terminal until such time as the embargo key is released and the file can be decrypted.

Embargo keys are generated either automatically or manually. If automatically generated, the SFTS will assign a randomly generated key when the uploaded embargo file is processed. If manually generated, a system administrator will have entered embargo keys for one or more specific transfers in advance.

The embargo key consists of a series of words or a phrase, with up to 40 characters. Before an embargo key is used, it is hashed using the H0 hashing function illustrated in FIG. 4, using the embargo key twice as first and second inputs to the function, to produce the actual encryption key for use in the encryption/decryption process described above.

The embargo key is delivered by E-mail or file transfer at the time and date specified when the embargoed file is uploaded to the SFTS. When the embargo key is sent, the E-mail message or the file transfer containing the embargo key includes the identifier for the embargo key, the embargo key itself, the encryption key generated from the embargo key using the H0 function and one or more file transfer ID's for which the embargo key may be used to decrypt the files.

The embargo key may be made available to a user by other means, for example by normal postal services, or by posting the embargo key onto a WWW site, which can be accessed by users after the date and time specified for release of the embargo keys.

Figure 17:
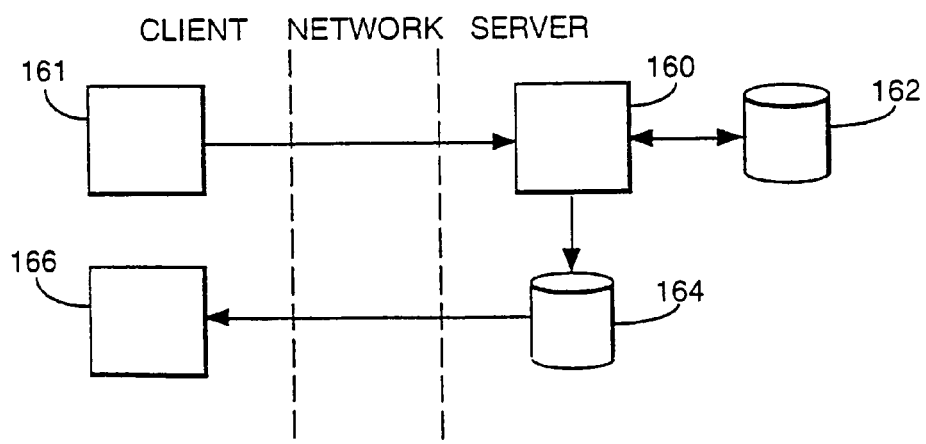
FIG. 17 is a block diagram illustrating a system for transferring e-mails in accordance with an embodiment of the invention.

FIG. 17 illustrates a further embodiment of the present invention, in the form of an E-mail server, 160, which is able to accept messages from an E-mail client application 161 via the Internet, to store the message in a delayed E-mail store 162 until a prescribed date and time, and then to deliver the message to the mailbox 164 of the recipient at the prescribed date and time. After the prescribed date and time, the recipient mail client 166 is able to retrieve the message for viewing by the user.

The delayed E-mail message is essentially similar to a conventionally-known E-mail message, and contains extra fields in the message header. These extra fields include a "delayed" field, which marks the message as a "delayed" E-mail, and specifies the date and time when the E-mail should be delivered to the mailbox of the recipient. The date and time are indicated using the day of the month, the month of the year, the year, the hour of the day and the minute past the hour of the intended delivery time. The extra fields also include a "confirm delivery" field which indicates whether the sender requires an acknowledgement when the delayed message is sent to the recipient. If no acknowledgement is required, the "confirm delivery" field need not be supplied, or is set to negative.

The delayed E-mail server 160 may thus be used to transmit a message from the SFTS containing an embargo key, which indicates the date and time at which the embargo key should be released to a file recipient. The mail server 160 then delivers the embargo key at the required date and time without further reference to the SFTS. If an acknowledgement is required by the SFTS, the server 160 sends an acknowledgement to the SFTS confirming delivery, or an error message if the message could not be correctly transmitted.

It will be appreciated that various modifications and variations are possible in relation to the above-described embodiments without departing from the spirit or scope of the present invention.

The invention claimed is:

1. A method of operating an authenticating server system for authenticating a user of a client application provided on a client terminal having no unique IP address via a data communications network, the server system being arranged to control access to a document stored on a resource server connected to said data communications network, said method comprising performing the following steps in said server system:

receiving at the resource server a request for said document generated by said client application provided on the terminal having no unique IP address;

evaluating at the resource server client-side persistent information accompanying said request including:

checking if the client-side persistent information contains an address token previously issued by the resource server which uniquely identifies the user, and performing the following steps at the resource server:

i) if no address token which uniquely identifies the user is contained in the client-side persistent information accompanying said request:

generating an address token which uniquely identifies the terminal address of the user, the generated address token replacing an IP address of the client terminal as a way of subsequently re-identifying the terminal address of the user;

transmitting the generated address token to the client application in a client-side persistent information packet so that the address token can be used to uniquely re-identify the user when re-transmitted with user authentication data to the resource server; and storing said address token for the user; and ii) if an address token is received which accompanies user authentication data, using said address token to uniquely re-identify the address of the terminal from which the original document request was received;

validating the address token using said user authentication data received from the client terminal in said client-side persistent information by reference to user authentication data already stored on said resource server;

updating the validated address token for an authenticated user with access status of the authenticated user associated with the validated address token;

transmitting a client-side persistent information packet containing the updated validated address token to the client terminal; and iii) if an address token which uniquely identifies the user is contained in the client-side persistent information accompanying said request and the address token is a validated address token, using said validated address token to enable said resource server to validate said request for said document by checking if said stored access status for said user includes access to said document.

2. A method according to claim 1, wherein a new address token is issued to said client application if said authentication data is invalid.

3. A method according to claim 2, wherein said address token further comprises data indicating the number of times an invalid authenticator has been received from said client application.

4. A method according to claim 3, wherein said method comprises transmitting no further address token to said client application if an address token received from said client application indicates that a predetermined number of invalid authenticators have been received from said client application.

5. A method according to claim 1, comprising timing out said address token of an application of a currently authenticated user if no document request is received from said client application for a predetermined period.

6. A method according to claim 1, comprising authenticating said user for access to a plurality of Web servers located in the same Internet domain; and
enabling each of said Web servers to validate document requests from the client application, which requests include said address token, by checking said status data on receipt of a document request.

7. A method as claimed in claim 1, wherein step (ii) further comprises:
transmitting said requested document to said client terminal along with the client-side persistent information packet containing the validated address token to the client terminal.

8. A method of operating an authenticating server system connected to a data communications network, the server system being arranged to authenticate a user of a client terminal connected via the data communications network to a resource server to control access by the user to a document stored on said resource server, the client terminal having no unique IP address, said method comprising:
storing within the authenticating server system authentication details of authorized users of said resource server;
sending the user an unvalidated tag to enable subsequent re-identification of the terminal address of the user;
authenticating the user by performing:
receiving user authentication data with a returned unvalidated tag at the resource server for the user from the client terminal having no unique IP address,
validating said authentication data by determining if said authentication data corresponds to equivalent stored authentication details, and if so:
updating the tag to a validated user identifying tag;
transmitting the validated user identifying tag to said client terminal for storage thereon, the validated user identifying tag being arranged to enable the client terminal to retransmit the validated user identifying tag with document requests directed at said resource server; and
storing at the resource server status data indicating said validated user identifying tag as identifying a terminal address and a currently authenticated user; and
checking at the resource server said status data on receipt of a request for a document received from the client terminal, wherein if said resource server determines the request contains a validated user identifying tag, the authenticated user is given access to the system.

9. The method as in claim 8, wherein if said authentication is invalid, a new identifying tag is issued, the new identifying tag comprising data indicating the number of times an invalid authenticator and/or invalid authentication data have been received from said client terminal.

10. The method as in claim 8, wherein said method further comprises not issuing a validated tag to said client terminal if a tag received from said client terminal indicates that a predetermined number of invalid tags and/or invalid authentication data have been received from said client terminal.

11. The method as in claim 8, comprising timing out said validated identifying tag as an identifying tag of a client terminal of a currently authenticated user if no document request is received from said client terminal for a predetermined period.

12. The method as in claim 8, comprising authenticating said user for access to a plurality of Web servers located in a same Internet domain; and
enabling each of said Web servers to validate document requests from the client terminal, which requests include said validated identifying tag, by checking said status data on receipt of a document request.

13. The method as in claim 8, wherein in said server system a plurality of documents are stored on a plurality of resource servers, wherein the step of validating the authentication data of a user comprises remotely authenticating the user by reference to authentication details of an authorized user stored by one of said plurality of resource servers, the remote authentication comprising:
generating status data to distinguish said user from other users who are not currently authenticated; and
generating a secret encryption key shared with said user, and wherein said method of operating the authentication server further comprises:
storing said status data in a storage device accessible to each of said plurality of resource servers to check an authentication status of said user by using said validated identifying tag for said client terminal received in said request; and
storing said shared secret key in a data store accessible by at least one of said resource servers for use during communications with said user.

14. The method as in claim 13, wherein said authenticating step comprises issuing a challenge to the client terminal, receiving a response to said challenge, and verifying said response.

15. The method as in claim 13, further comprising updating said status data for an authenticated user following said storing step in said storage device.

16. The method as in claim 15, wherein said updating step is performed in response to a time-out associated with said status data.

17. The method as in claim 15, wherein said updating step is performed in response to access by one of said resource servers to said status data.

18. The method as in claim 16, wherein said updating step is performed in response to a request by the client terminal.

19. The method as in claim 13, wherein said status data is stored in a data store which each of said resource servers are able to access.

20. The method as in claim 13, wherein said authentication details include data identifying the rights of access of individual users to one or more of said resource servers.

21. An authenticating server system adapted to perform the method of claim 8, wherein the client terminal supports a client application which the user uses to seek access to said document, and wherein the validated user identifying tag comprises a unique user identifying tag for the client application of the client terminal.

22. An authenticating server system adapted to perform the method of claim 8.

23. A method of re-identifying a user when performing steps in an authentication method, the authentication method enabling the user to access a document requested via a terminal connected by an Internet Protocol connection to an application server, wherein the user terminal individually has no unique IP address, said re-identifying method comprising:
- receiving a document request from an application client of the user for access to said application server;
- checking if the request contains a validated or unvalidated token enabling the terminal of the user to be subsequently re-identified, and if not,
- providing an address token to the user in an initial cookie containing in a field an identifying tag which replaces the non-unique IP address of the terminal as a means for subsequently re-identifying the terminal,
- storing at the application server said address token as an unvalidated replacement address token;
- receiving authentication details from the user including a username and password with a returned unvalidated address token, whereby the terminal address is re-identified from the replacement address token.

24. A method as claimed in claim 23, wherein the method further comprises performing the following steps to authenticate the user at the terminal by comparing stored authentication details with said received authentication details:
- hashing said received user name and password at a secure password client;
- passing on the hashed user name and password to a cache management server which polls a secure password server to check whether the username and password hash matches a stored value for an authorised user; and
- if the user is authenticated,
- the cache management server performing the steps of:
  - retrieving an access rights token from the secure password server, and if the access rights token indicates the user is allowed to access the application server to which the document request is directed,
  - sending an access allowed message to the application server, and
  - storing status data comprising: the access rights token, the validated address token and an authenticator comprising the hashed user name and password for the user, to collectively identify the terminal as a terminal of a currently authenticated user; and
- at the application server performing the steps of,
  - receiving said access allowed message;
  - sending the requested document with an updated cookie containing:
    - the validated address token, and
    - the authenticator comprising the username and password hash; and
- at the client terminal, storing the updated cookie comprising said validated address token, whereby said user is re-identified and authenticated when generating subsequent document requests by allowing said application server to access said status data at said cache management server in order to check the authentication status of a user on receipt of a document request containing said validated address token.

25. A method as in claim 23, wherein the field is a name=value field.

* * * * *